(12) United States Patent
Shapiro

(10) Patent No.: US 8,474,322 B1
(45) Date of Patent: Jul. 2, 2013

(54) ECCENTRIC LOAD SENSING DEVICE USED TO SENSE DIFFERENTIAL PRESSURES

(75) Inventor: Daniel Shapiro, Branford, CT (US)

(73) Assignee: Strain Measurement Devices, Inc., Wallingford, CT (US)

( * ) Notice: Subject to any disclaimer, the term of this patent is extended or adjusted under 35 U.S.C. 154(b) by 216 days.

(21) Appl. No.: 12/974,137

(22) Filed: Dec. 21, 2010

Related U.S. Application Data

(62) Division of application No. 12/218,703, filed on Jul. 17, 2008, now Pat. No. 7,878,074.

(51) Int. Cl.
*G01L 9/04* (2006.01)

(52) U.S. Cl.
USPC .......................................................... 73/720

(58) Field of Classification Search
USPC ............ 73/196, 168, 861.63, 861.66, 861.42, 73/861.52, 721, 728, 861.61, 720
See application file for complete search history.

(56) References Cited

U.S. PATENT DOCUMENTS

| | | | |
|---|---|---|---|
| 4,528,855 A * | 7/1985 | Singh | 73/721 |
| 5,042,254 A * | 8/1991 | Schonlau et al. | 60/562 |
| 5,259,248 A * | 11/1993 | Ugai et al. | 73/721 |
| 6,033,188 A | 3/2000 | Baldus et al. | 417/222.1 |
| 6,122,974 A | 9/2000 | Sato et al. | 73/754 |
| 6,857,324 B2 | 2/2005 | Sato et al. | 73/861.61 |
| 7,555,960 B2 | 7/2009 | Nakano et al. | 73/781 |

* cited by examiner

*Primary Examiner* — Jewel V Thompson
(74) *Attorney, Agent, or Firm* — Fattibene and Fattibene LLC; Paul A. Fattibene

(57) ABSTRACT

A differential pressure sensor positioned adjacent a first pressure chamber and a second pressure chamber separated by a nozzle. Flow in a conduit is determined by detecting the pressure on either side of a nozzle. Changes in pressure are proportional to a change in flow. An integrated differential pressure sensor having different pressure detecting portions with strain gauges thereon detects differences in deflection of each pressure sensor portion resulting from change in fluid flow. A bridge circuit detects changes in the signals from the two different pressure sensor portions creating a differential which is proportional to a change in liquid flow. The present invention reduces the need for calibration of pressure sensors and improves the detection of fluid flow. The present invention has many applications and can detect small changes in fluid flow and is particularly applicable to the medical field where in many procedures, small fluid flows must be measured or determined accurately.

10 Claims, 9 Drawing Sheets

ECCENTRIC LOAD SENSING DEVICE USED TO SENSE DIFFERENTIAL PRESSURES

RELATED APPLICATION

This application is a divisional of application Ser. No. 12/218,703 filed Jul. 17, 2008 now U.S. Pat. No. 7,878,074.

FIELD OF THE INVENTION

The present invention relates in general to a pressure sensor for detecting differences in two pressures, and more particularly to an integrated pressure sensor that detects fluid pressure for detecting changes in fluid flow.

BACKGROUND OF THE INVENTION

There are many different types of pressure sensors used to measure pressures created by various forces in many different locations. Typically, pressure sensors are comprised of a strain gauge placed on a surface that deforms when a pressure is applied to the surface. Signals from the strain gauge are used to calculate the pressure applied to the surface by detecting the deformation of the surface due to the pressure. A strain gauge often takes the form of a variable resistor. These strain gauges are all very accurate but generally require calibration and maintenance in order to provide accurate pressure detection. Generally, in measuring a fluid flow, a pressure sensor is placed on either side of a nozzle formed within a conduit. The nozzle forms a restriction in the conduit forming a venturi and due to the Bernoulli effect, will result in different pressures on either side of the nozzle depending upon the flow characteristics within the conduit. Accordingly, by measuring the pressure on either side of the nozzle, the fluid flow or changes in the fluid flow can be calculated and determined. The pressure drop across an orifice is well understood and directly proportional to fluid flow. The fluid flow is proportional to the square root of the pressure differential. Very small changes in fluid flow may be detected. There are different devices that have been developed for detecting fluid flow in different applications. One such application is in the medical field where small fluid flows or changes in fluid flows must be accurately detected.

One such device is illustrated schematically in FIG. 1. FIG. 1 generally illustrates a fluid control system 10 having a control unit 12 and a replaceable or disposable unit 14. A replaceable conduit 16 formed in the replaceable or disposable unit 14 has an orifice or a nozzle 20. On either side of the orifice or nozzle 20 are flexible membranes 18 and 22. Inlet 24 permits fluid to flow in the direction of the arrows. The replaceable or disposable unit 14 is placed within the control unit 12. The inlet 24 then is coupled with the control unit conduit 30 having input 32. The flexible membranes 18 and 20 are then placed adjacent the first pressure sensor 28 and the second pressure sensor 26. The first and second pressure sensors 26 and 28 provide a first pressure signal 36 and a second pressure signal 34, respectively. These pressure signals 34 and 36 are transmitted to a flow controller 38 that controls a pump 40 coupled to the control unit conduit 30. Accordingly, depending upon the fluid pressure detected by the second and first pressure sensors 26 and 28, the fluid flow may be calculated and any changes detected.

FIG. 2 is a simplified schematic diagram illustrating the detection principal implemented in the device illustrated in FIG. 1. In FIG. 2, conduit 16' contains a fluid flowing in the direction of the arrows. Orifice or nozzle 20' creates a restriction and results in a pressure $P_1$ being formed on one side of the orifice or nozzle 20' and a pressure $P_2$ formed on the other side of the orifice or nozzle 20'. A first pressure sensor 28' is placed adjacent a flexible membrane 22' on one side of the nozzle 20' to detect the first pressure $P_1$. Similarly, a second pressure sensor 26' is placed adjacent a flexible membrane 18' to detect pressure $P_2$ on the other side of the orifice or nozzle 20'. Accordingly, the two pressure readings are used to determine fluid flow within the conduit 16'. While the fluid control and detection system illustrated in FIGS. 1 and 2 have been adequate to detect fluid flow in many applications, it requires the expense of two separate pressure sensors and the need to calibrate each of the two different pressure sensors so as to provide accurate flow detection. The use of two separate pressure sensors adds to the expense of the device as well as makes necessary the requirement for accurately calibrating each separate pressure sensor so as to assure accurate detection of flow. This added to the need for increased maintenance as well as possible errors in the flow rate detected due to errors in the calibration of the two different pressure sensors.

Therefore, there is a need to improve fluid flow control and detection systems so that they will be less expensive, more easily maintained, and provide more accurate results.

SUMMARY OF THE INVENTION

The present invention is comprised of an eccentric load sensor coupled with a structure that contains a means to separate the flow into two distinct pressure regions. A strain gauge like circuit is integrated into the eccentric load sensor such that changes in the eccentric loading of the sensor create a voltage signal in the strain gauge circuit that are proportional to the eccentric loading. When the eccentric load sensor is coupled to two distinct pressures in a flow regime, the difference in pressures is seen as an eccentric loading on the sensor and the resulting voltage output is representative of fluid flow.

In one embodiment, a housing is divided into a first chamber and a second chamber. The first chamber is coupled to a conduit on one side of a nozzle and the second chamber is coupled to a conduit on the other side of the nozzle. The eccentric load sensor has a first and second portion. A first portion is coupled to the first chamber of the housing and a second portion is coupled to the second chamber of the housing. A bridge circuit detects differences in loading from the first portion and the second portion providing a signal that is proportional to the fluid flow and is capable of detecting any change in fluid flow.

In another embodiment, a nozzle is placed between the first and second chambers of the housing.

Accordingly, it is an object of the present invention to detect eccentric loads, such as loads created by pressure differentials.

It is another object of the present invention to more accurately measure fluid flow.

It is yet another object of the present invention to provide an integral sensor capable of measuring fluid flow.

It is an advantage of the present invention that it reduces or eliminates the need to calibrate pressure sensors in order to accurately detect a change in fluid flow.

It is another advantage of the present invention that it is capable of being used in many devices requiring the measurement of the difference in two loads or pressures as in the measurement of fluid flow.

It is a feature of the present invention that a net difference in pressure from a first and second portion of an integrated flow chamber is coupled to the sensor in such a way that an eccentric load is placed on the sensor that is to detect changes in fluid flow.

It is a feature of an embodiment of the present invention that a load sensor surface is coupled to a load sensor through a connecting member.

These and other objects, advantages, and features will become more readily apparent in view of the following detailed description.

DETAILED DESCRIPTION OF THE PREFERRED EMBODIMENTS

Figure 1:
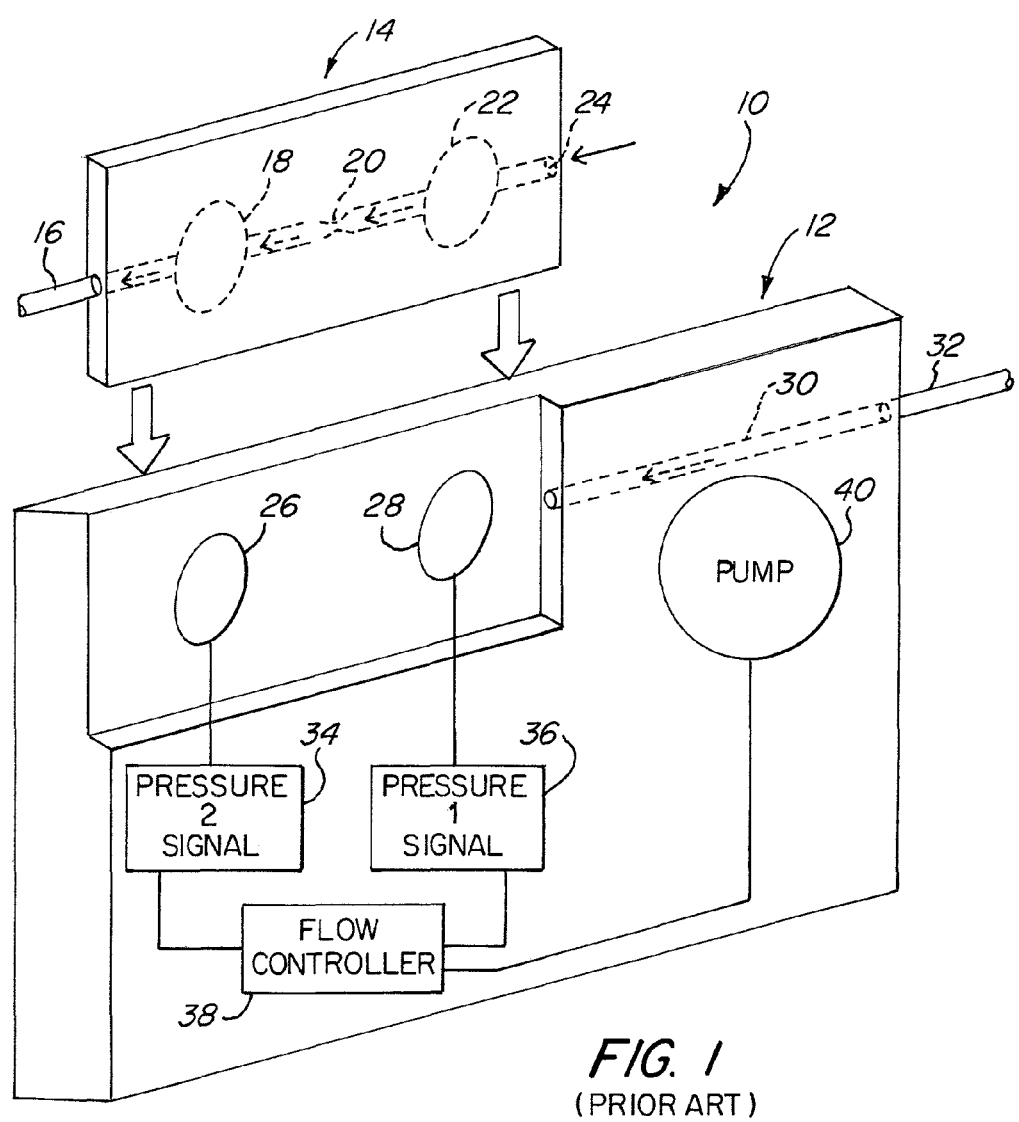
FIG. 1 schematically illustrates a prior art fluid flow control system.
Figure 2:
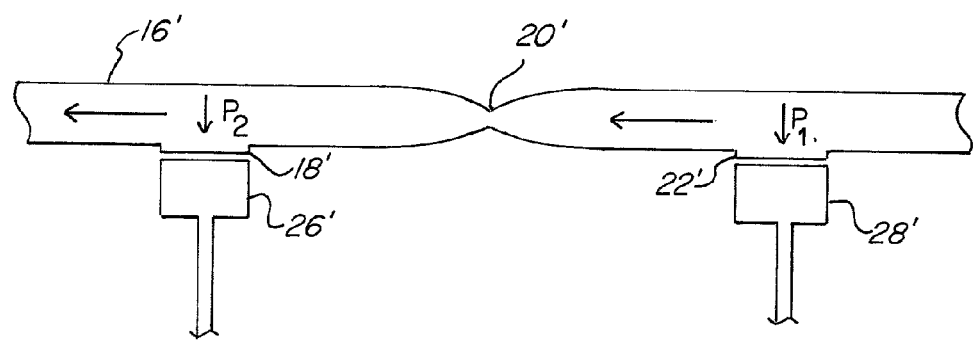
FIG. 2 schematically illustrates the principle of operation of a prior art fluid flow control system.

FIGS. 1 and 2 schematically illustrate prior art devices that have been described in the Background of the Invention.

Figure 3:
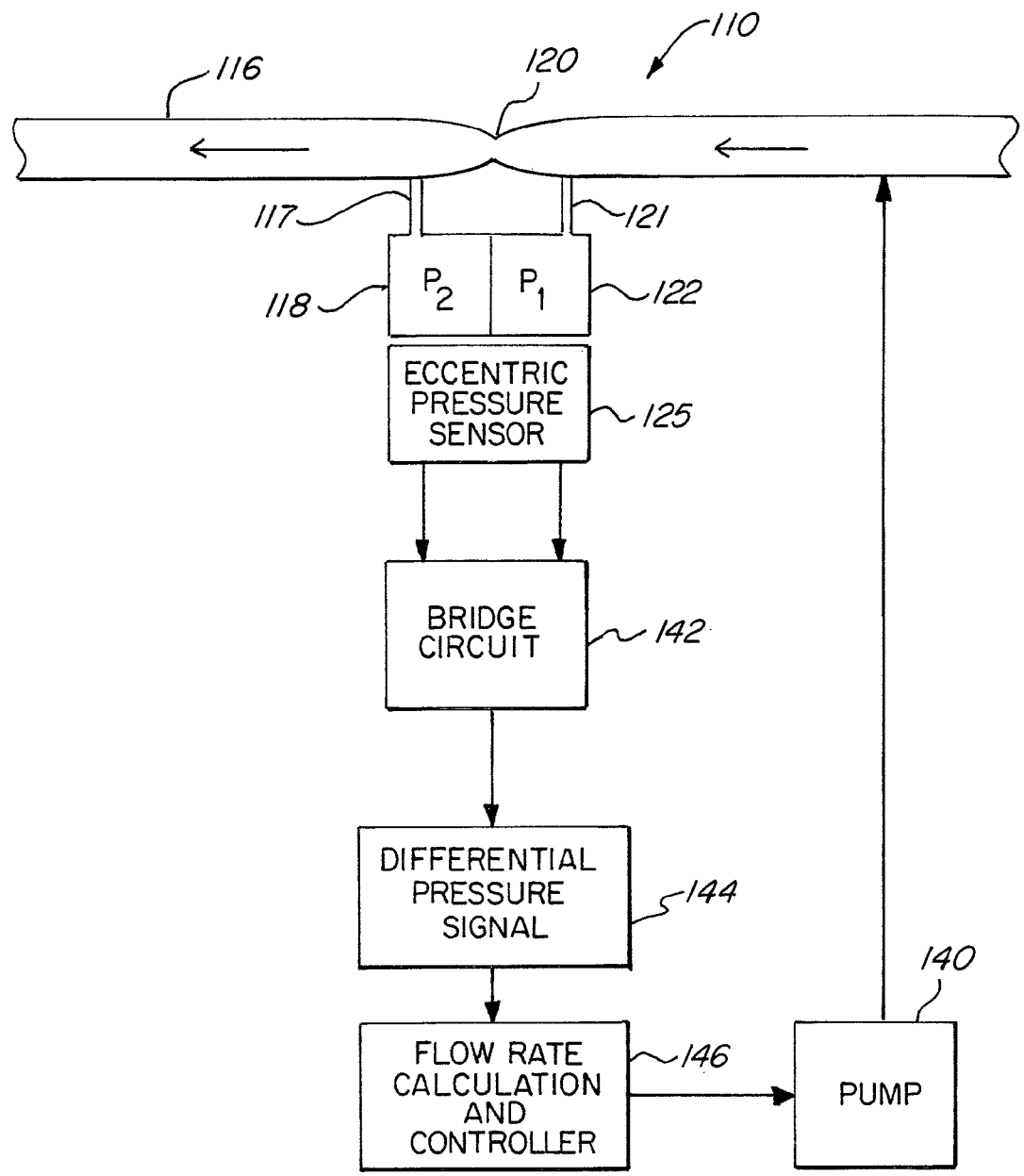
FIG. 3 schematically illustrates the present invention.

FIG. 3 schematically illustrates an embodiment of an integrated differential load sensor of the present invention. The flow control system 110 of the present invention detects changes in fluid flow in conduit 116 having an orifice or nozzle 120. The fluid flow is generally in the direction of the arrows. A first pressure input 121 on one side of the nozzle 120 is coupled to a first pressure chamber 122 creating a first pressure $P_1$ therein. Similarly, a second pressure input 117 is coupled to the other side of the nozzle 120 and a second pressure chamber 118 having a second pressure $P_2$ therein. An eccentric load sensor 125 is placed adjacent the first and second pressure chambers 122 and 118. The eccentric load sensor 125 has a first portion adjacent the first pressure chamber 122 and a second portion adjacent the second pressure chamber 118. The differential pressure that is created between first pressure chamber 122 and second pressure chamber 118 is manifested as an eccentric load on the surface of eccentric load sensor 125. A differential output signal is created from eccentric load sensor 125 that is proportional to the differential pressure that is created between the first and second pressure chambers 122 and 118. A bridge circuit 142 is used to detect very small differences or an imbalance in a resistor network, wherein the electrical parameter is resistance. Accordingly, if the different portions of the respective eccentric load sensor are caused to be deflected by slightly different amounts due to differences in pressure between either side of the nozzle 20 it is indicative of a fluid flow or change in fluid flow. The change in fluid flow can then be calculated by well known relationships. A differential load signal 144 is obtained representative of the difference in pressure and is provided to a flow rate calculation and a controller 146 that calculates the changes required to maintain the predetermined flow. The flow rate calculation and controller 146 provides a signal to pump 140. The pump 140 can then adjust the flow within the conduit 116 so as to provide a predetermined flow therein. Accordingly, the flow rate within the conduit 116 can be very accurately determined, controlled, and adjusted so as to maintain predetermined flow rate parameters. This is especially critical in many medical applications where undesirable changes in fluid flow when not detected and controlled may result in very serious medical situations.

The present invention therefore uses a single eccentric load sensor structure. The bending mode of the sensor measures eccentric or non-concentric loads to determine the differential pressure across a membrane or diaphragm. The non-concentric loading is proportional to difference in pressure. The off axis loads can be measured and translated into directly proportional voltage outputs or signals. The change in flow rate can then be calculated and flow measured or controlled to a predetermined flow rate. Calibration of individual pressure sensors to obtain accurate measurements is therefore eliminated with the present invention.

Figure 4:
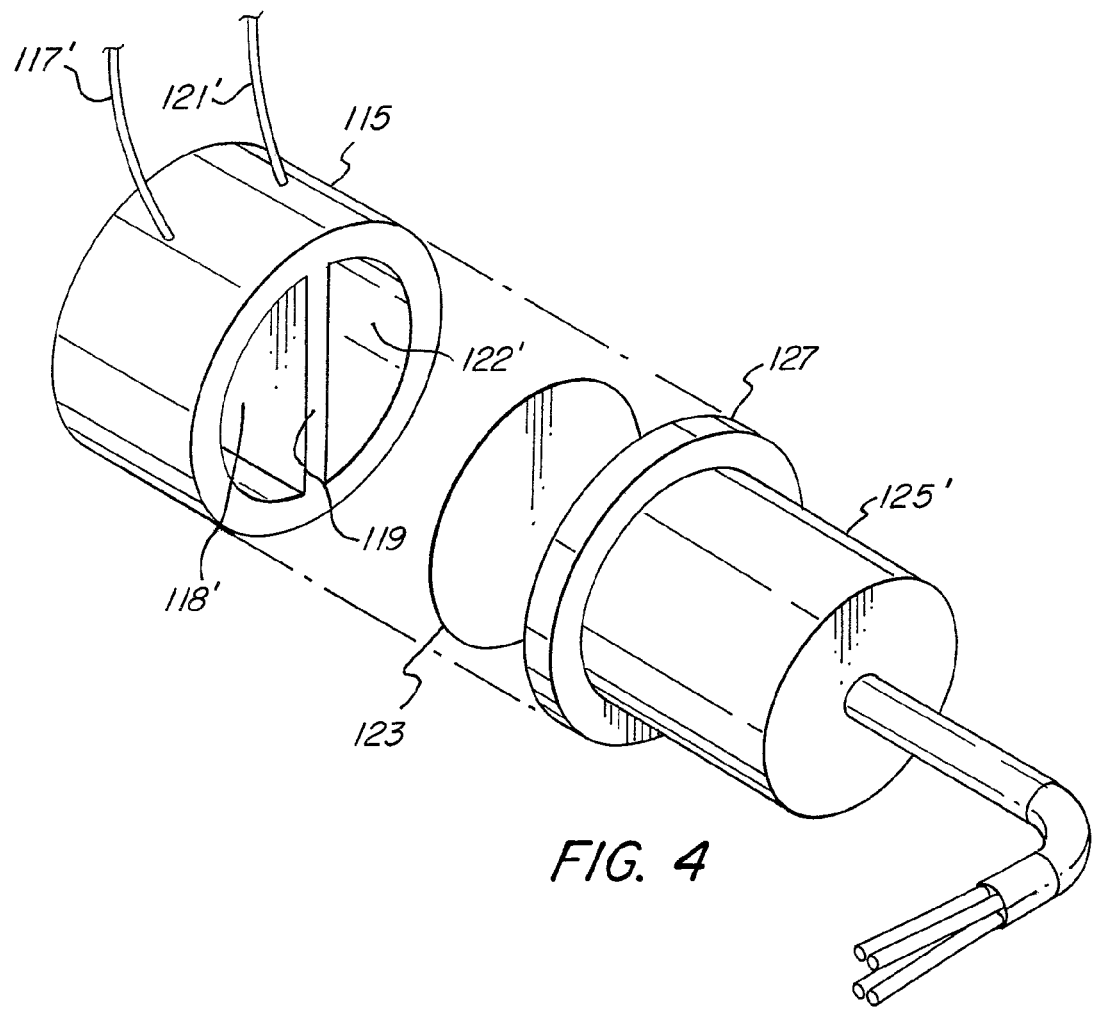
FIG. 4 schematically illustrates an embodiment of the present invention.

FIG. 4 is a schematic perspective view illustrating a flow sensor assembly of an embodiment of the present invention. Housing 115 has a divider 119 dividing the housing 115 into a first pressure chamber 122' and a second pressure chamber 118'. A first pressure input 121' provides a pressure input to the first pressure chamber 122' and a second pressure input 117' provides a pressure input to the second pressure chamber 118'. A flexible membrane 123, which may be made of silicone or other inert flexible material, is placed over the openings of the first and second pressure chambers 122' and 118'. An eccentric load sensor 125' having a surface 127 is placed adjacent the flexible membrane 123.

Figure 5:
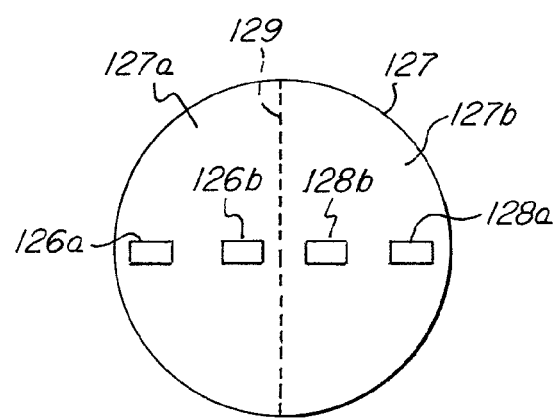
FIG. 5 schematically illustrates the surface of a load sensor of the embodiment of the invention illustrated in FIG. 4.

FIG. 5 schematically illustrates the eccentric load sensor surface 127. The eccentric load sensor surface 127 is divided into a first load sensor portion 127a and a second load sensor portion 127b being separated by dashed line 129 which corresponds to the position of the divider 119 of the housing 115, illustrated in FIG. 4. A plurality of strain gauges 126a and 126b are placed on the second load sensor portion 127a. A second plurality of strain gauges 128a and 128b are placed on the first load sensor portion 127B. The strain gauges 126a, 126b, 128a, 128b detect any small deflection in the eccentric load sensor surface 127 caused by the differences in fluid pressure within the first and second pressure chambers 122' and 118', illustrated in FIG. 4.

It should be appreciated that the present invention, by utilizing an eccentrically loaded sensor that is divided into at least two portions can register differences in pressure based on the differential or eccentric loading of the different load sensor portions. Therefore, any inaccuracies or calibration errors in the reading of absolute pressure are avoided and will not result in an error in the change in flow detected.

Figure 6:
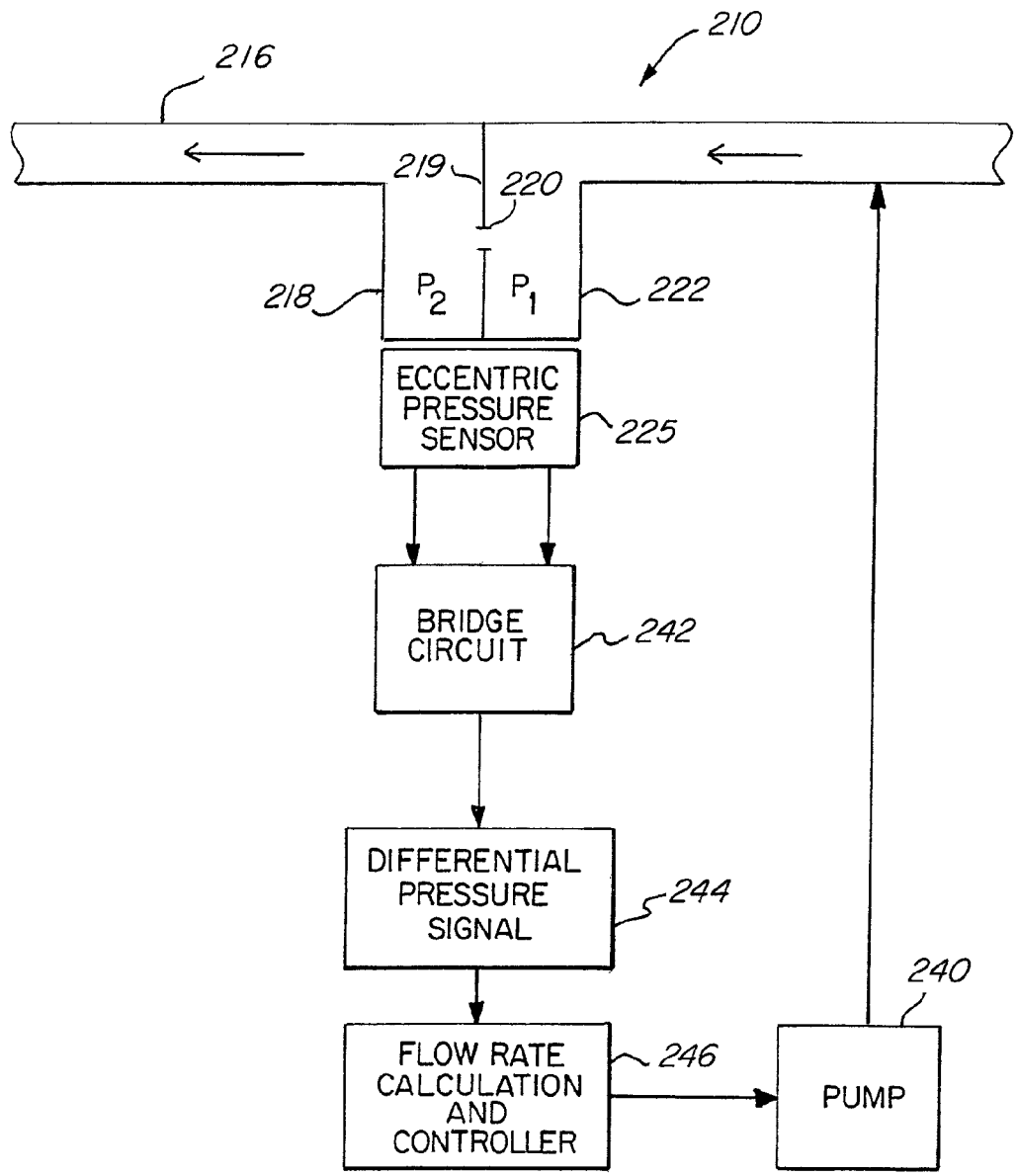
FIG. 6 schematically illustrates another embodiment of the present invention.

FIG. 6 schematically illustrates another embodiment of the present invention where the orifice or nozzle 220 is integrally placed within a housing between the two pressure chambers. In this embodiment, the flow control system 210 measures fluid flow in conduit 216. An orifice 220 is placed within a divider 219 that separates a first pressure chamber 222 containing a fluid at a first pressure $P_1$ and a second pressure chamber 218 containing a fluid having a pressure $P_2$. An eccentric load sensor 225 is placed adjacent the first pressure chamber 222 and the second pressure chamber 218. Similar to the embodiment illustrated in FIG. 3, the eccentric load sensor 225 detects differences in loading caused by the two pressures $P_1$ and $P_2$ and induces a signal to the bridge circuit 242. The bridge circuit 242 which detects differences in the loading provides a differential pressure signal 244 which is provided to the flow rate calculation and control 246. The flow rate calculation and control 246 calculates differences in flow rate and controls pump 240 to make adjustments in the fluid flow within conduit 216. This embodiment has the advantage that the nozzle 220 can be more integrally formed between the pressure chambers 212 and 218.

Figure 7:
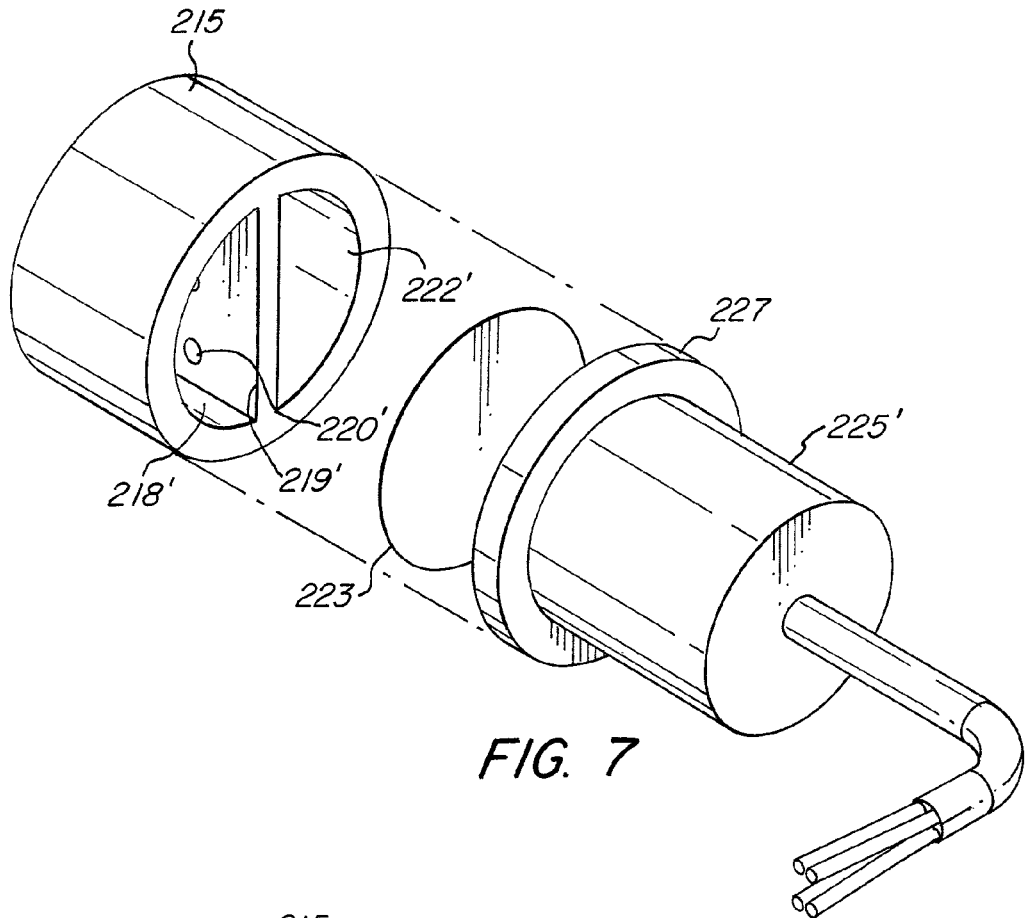
FIG. 7 schematically illustrates another embodiment of the present invention.

FIG. 7 is a schematic perspective view of the pressure sensor assembly of the embodiment illustrated in FIG. 6. A housing 215 comprises a first pressure chamber 222' and a second pressure chamber 218' separated by a divider 219' having a plurality of nozzles or orifices 220' therein. Fluid flows through the first pressure chamber 222' and the orifices 220' into the second pressure chamber 218'. Any changes in fluid flow will result in changes in pressure between the first pressure chamber 222' and the pressure chamber 218'. A flexible membrane 223 is placed adjacent the second and first pressure chambers 222' and 218'. An eccentric load sensor surface 227 is placed adjacent the flexible membrane 223. The eccentric load sensor surface 227 may have configurations of strain gauges similar to that illustrated in FIG. 5.

Figure 8:
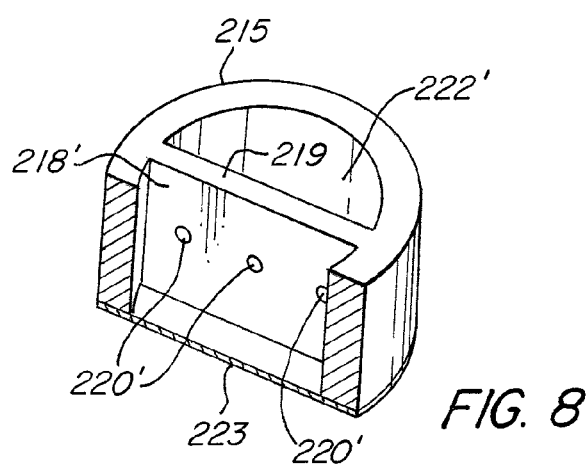
FIG. 8 is a partial cross section perspective view illustrating a portion of an embodiment of the present invention.

FIG. 8 is a perspective cross section illustrating the nozzles or orifices 220' formed within the divider 219 of the housing 215. The membrane 223 is adjacent the first pressure chamber 222' and the second pressure chamber 218'.

Figure 9:
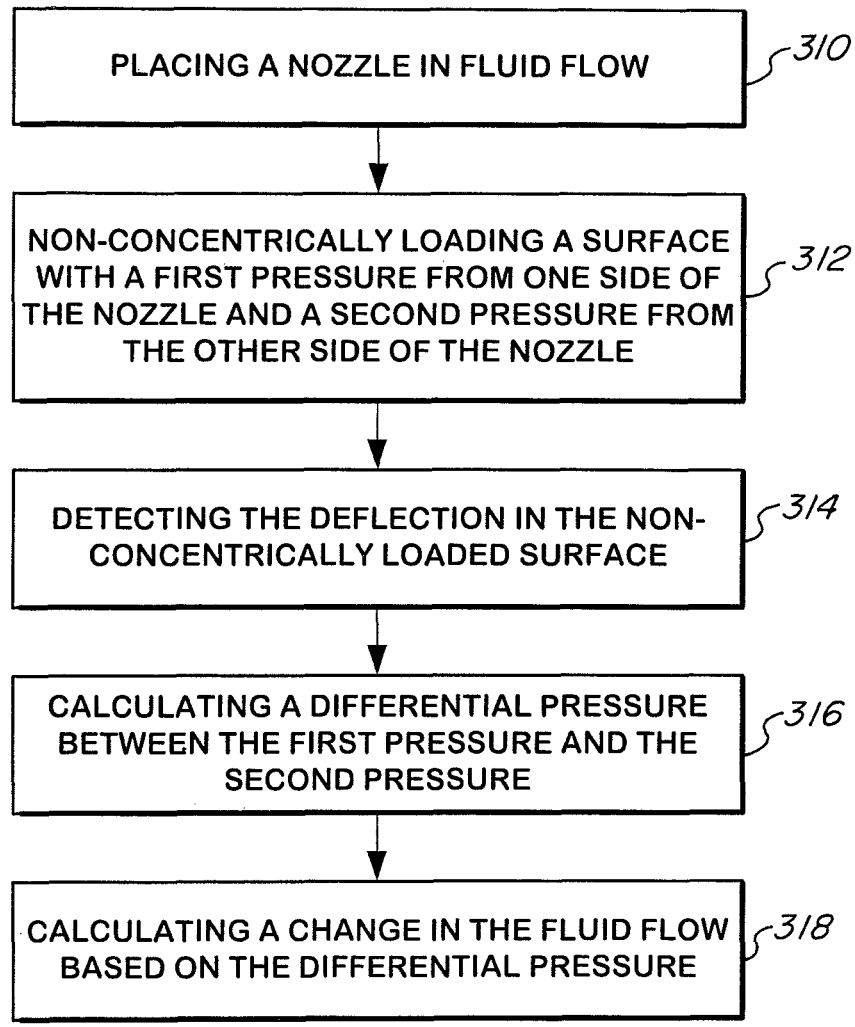
FIG. 9 is a block diagram illustrating the method steps of an embodiment of the present invention.

FIG. 9 is a block diagram illustrating the method steps of practicing an embodiment of the present invention. In FIG. 9 block 310 represents the step or act of placing a nozzle in fluid flow. Block 312 represents the step or act of non-concentrically loading a surface with a first pressure from one side of the nozzle and a second pressure from the other side of the nozzle. Block 314 represents the step or act of detecting the deflection in the non-concentrically loaded surface due to the application of the first and second pressures. Block 316 represents the step or act of calculating a differential pressure between the first pressure and the second pressure due to the deflection in the non-concentrically loaded surface. Block 318 represents the step or act of calculating a change in fluid flow based on or as a function of the differential pressure.

Figure 10:
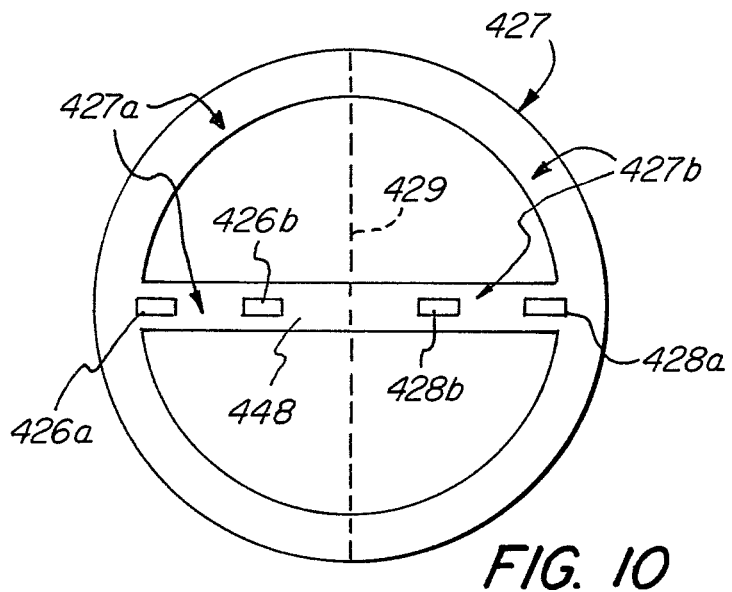
FIG. 10 is a plan view schematically illustrating another embodiment of a load sensor.
Figure 11:
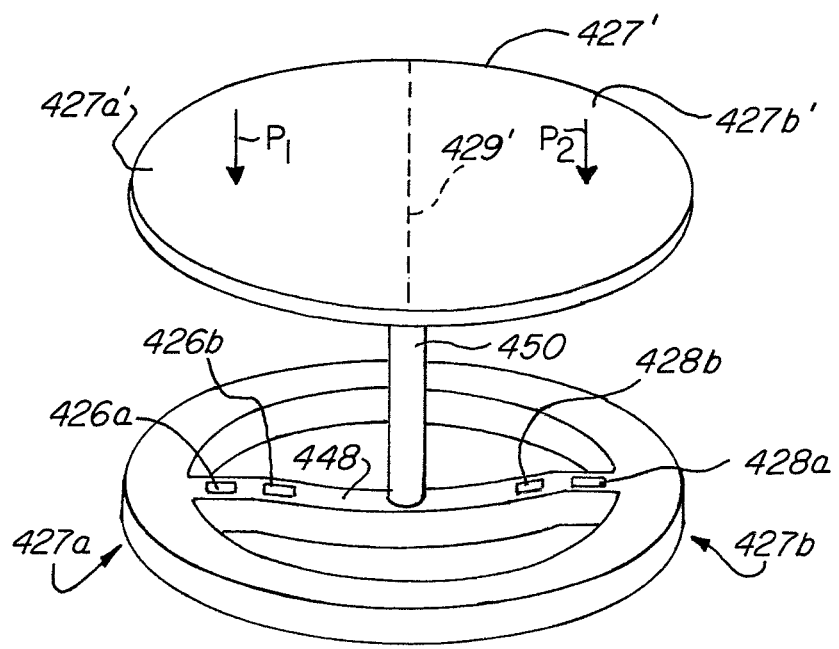
FIG. 11 is a schematic perspective view illustrating another embodiment of a load sensor with an elevated second surface.

FIGS. 10 and 11 illustrate another embodiment of a load sensor having a load sensor surface. In this embodiment a load sensor surface 427' is placed over and coupled to the eccentric load sensor 427.

As illustrated in FIG. 10, the eccentric load sensor 427 is comprised of a first load sensor portion 427a and a second load sensor portion 427b divided by dashed centerline 429. A web 448 forms and extends between the first load sensor 427a and the second load sensor portion 427b. While a web 448 is illustrated, other structures may be used as long as the structure serves as a surface on which a strain gauge may be placed to detect movement due to a load. Strain gauges 426a, 426b, 428b, and 428a are place along the length of the web 448 to detect the load or movement due to a force or pressure differential.

FIG. 11 illustrates a load being placed eccentrically on the load sensor surface 427' as a result of a difference in pressures $P_1$ and $P_2$. Pressure $P_1$ is placed on a first load sensor surface portion 427a' and pressure $P_2$ is placed on a second load sensor surface portion 427b'. Dashed line 429' illustrates the separation of the first load sensor surface portion 427a' and the second load sensor surface portion 427b'. Connecting member 450 between the load sensor surface 427' and the eccentric load sensor 427 transmits a force to the web 448. The web 448 therefore deflects or moves. In FIG. 11 the web 448 is illustrated as being slightly deflected. As a result the strain gauges 426a, 426b, 428b, and 428a are placed in either compression or tension and the differential pressure between the two pressures $P_1$ and $P_2$ can be determined or calculated using well known relationships.

Figure 12:
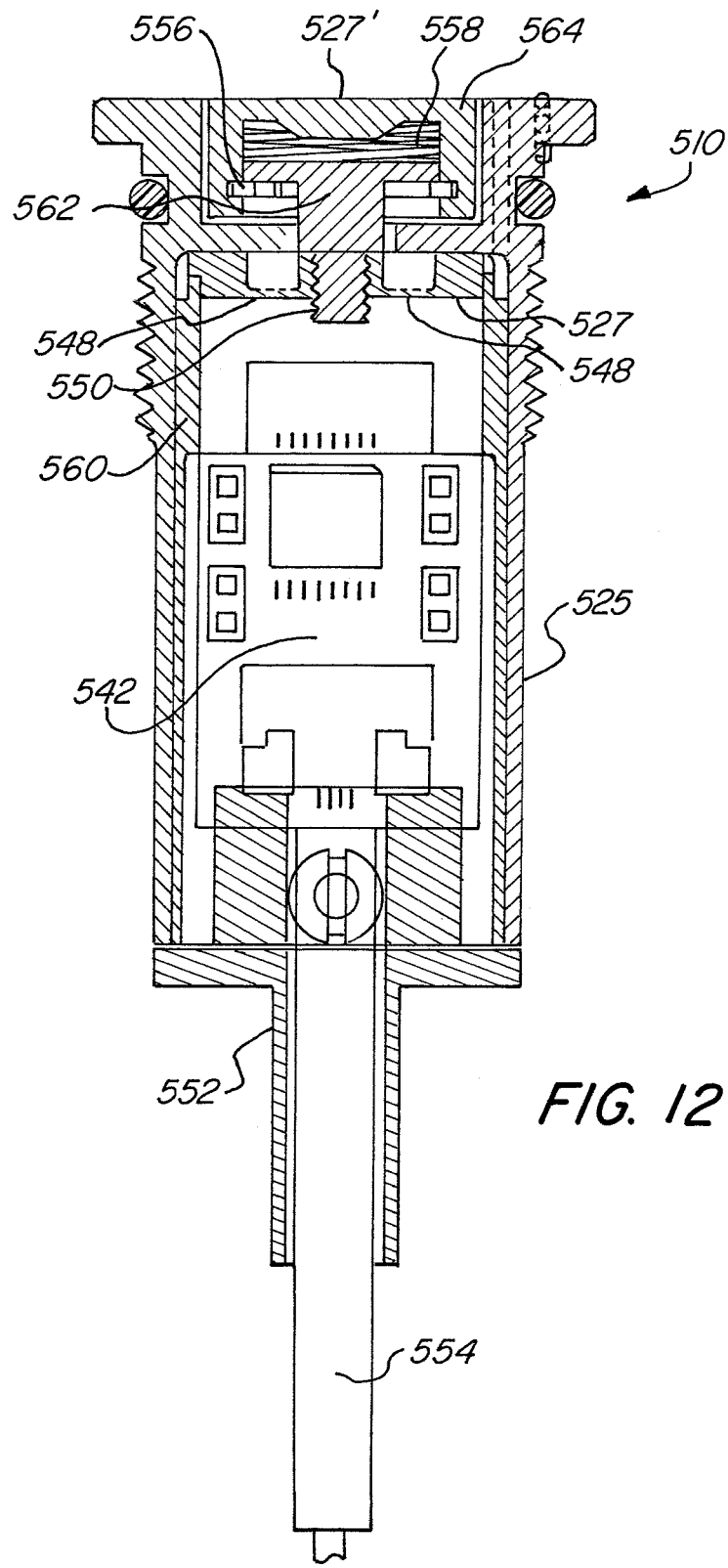
FIG. 12 is a schematic cross section of an eccentric load sensor assembly of another embodiment of the present invention.

FIG. 12 illustrates a preferred embodiment of an eccentric load sensor assembly 510 of the present invention. A housing 525 has a sleeve 560 placed therein. The sleeve 560 positions a load sensor 527, having strain gauges placed thereon similar to the load sensor 427 illustrated in FIGS. 10 and 11, against a portion of the housing 525. A load sensor surface 527' is formed on spring cap 564. A spring piston 562 is held in the spring cap 564 by a retaining ring 556. A spring 558 biases the spring piston 562 against the retaining ring 556. A connecting member 550 is connected between the spring cap 564 and the load sensor 527. Therefore, an eccentric load placed on the load sensor surface 527' is transmitted by the connecting member 550 to the load sensor 527 causing movement that is detected by strain gauges placed on the web 548 on the load sensor 527. The spring 558 acts as a mechanical shunt to prevent overloading. A load placed on the load sensor surface 527' below a predetermined force will be transmitted to the load sensor 527. A load greater than a predetermined force will cause the spring 558 to compress preventing large forces from being transmitted to the load sensor 527, preventing possible damage. The load sensor 527 is coupled to a circuit board 542 used to calculate or provide a signal representing the movement and differential load caused by the eccentric loading of the load sensor surface 527'. The signals are carried by the cable 554 to other devices, such as a display, not shown. End cap 552 seals the housing 525.

The present invention can be used in a variety of systems requiring the detection of a differential load or pressure and particularly in systems that require detection of changes in fluid flow. The present invention, by providing an eccentric load sensor divided into different sensing portions, makes possible the differential detection of pressure, improving accuracy and reducing the need for calibration.

Although the preferred embodiments are illustrated and described, it will be obvious to those skilled in the art that various modifications may be made without departing from the spirit and scope of this invention.

What is claimed is:

1. An integrated differential pressure sensing system comprising:
   a housing;
   a divider formed within said housing dividing said housing into a first pressure chamber and a second pressure chamber;
   an orifice formed within said divider coupling the first pressure chamber with the second pressure chamber;
   an integrated pressure sensor having a surface divided into a first pressure sensor portion and a second pressure sensor portion, the first pressure sensor portion positioned adjacent the first pressure chamber and the second pressure sensor portion positioned adjacent the second pressure chamber; and
   a bridge circuit coupled to said first pressure sensor portion and said second pressure sensor portion,
   whereby said bridge circuit is capable of indicating a differential in an electrical parameter between the first and second pressure sensor portions permitting detection of a difference in a pressure applied to the first pressure sensor portion and the second pressure sensor portion of said integrated pressure sensor.

2. An integrated differential pressure sensing system as in claim 1, wherein:
said integrated pressure system is loaded non-concentrically by the first and second pressure chambers.

3. An integrated differential pressure sensing system as in claim 2 further comprising:
calculator means, coupled to said bridge circuit, for calculating a flow rate based on the differential in the electrical parameter between the first and second pressure sensor portions.

4. An integrated differential pressure sensing system as in claim 3 wherein:
the electrical parameter comprises resistance.

5. An integrated differential pressure sensing system as in claim 2 wherein:
said integrated pressure sensor comprises a strain gauge, whereby a deflection in the surface is detected.

6. A differential load sensor comprising:
a first surface;
a divided fluid housing having a first chamber and second chamber placed adjacent said first surface;
an orifice formed in said divided fluid housing between the first chamber and the second chamber;
a strain gauge circuit coupled to said first surface capable of providing a signal that is proportional to an eccentric load that is applied to said first surface by the first chamber and the second chamber; and
signal means, receiving the signal, for generating an eccentric load signal representative of the differential loading across a centerline of the first surface,
whereby the differential loading across the first surface is detected.

7. A differential load sensor as in claim 6 further comprising:
a flexible membrane placed adjacent said first surface.

8. A differential load sensor comprising:
a first surface;
a strain gauge circuit coupled to said first surface capable of providing a signal that is proportional to an eccentric load that is applied to said first surface; and
signal means, receiving the signal, for generating an eccentric load signal representative of the differential loading across a centerline of the first surface;
a flexible membrane placed adjacent said first surface;
a fluid housing placed adjacent said flexible membrane;
a divider dividing said fluid housing into a first chamber and a second chamber; and
an orifice placed within said divider,
whereby the differential loading across the first surface is detected.

9. A differential load sensor as in claim 8 further comprising:
a first fluid pressure device providing a first fluid pressure to said first chamber; and
a second fluid pressure device providing a second fluid pressure to said second chamber,
whereby a difference in the first and second fluid pressure can be detected and a flow rate determined.

10. A differential load sensor as in claim 9 wherein:
said first and second fluid pressure devices comprises a pump.

* * * * *